3,319,280
PAINTBRUSH HOLDER
Fred A. Trachsler, 617 10th Ave.,
San Francisco, Calif. 94103
Filed Apr. 28, 1966, Ser. No. 546,086
2 Claims. (Cl. 15—146)

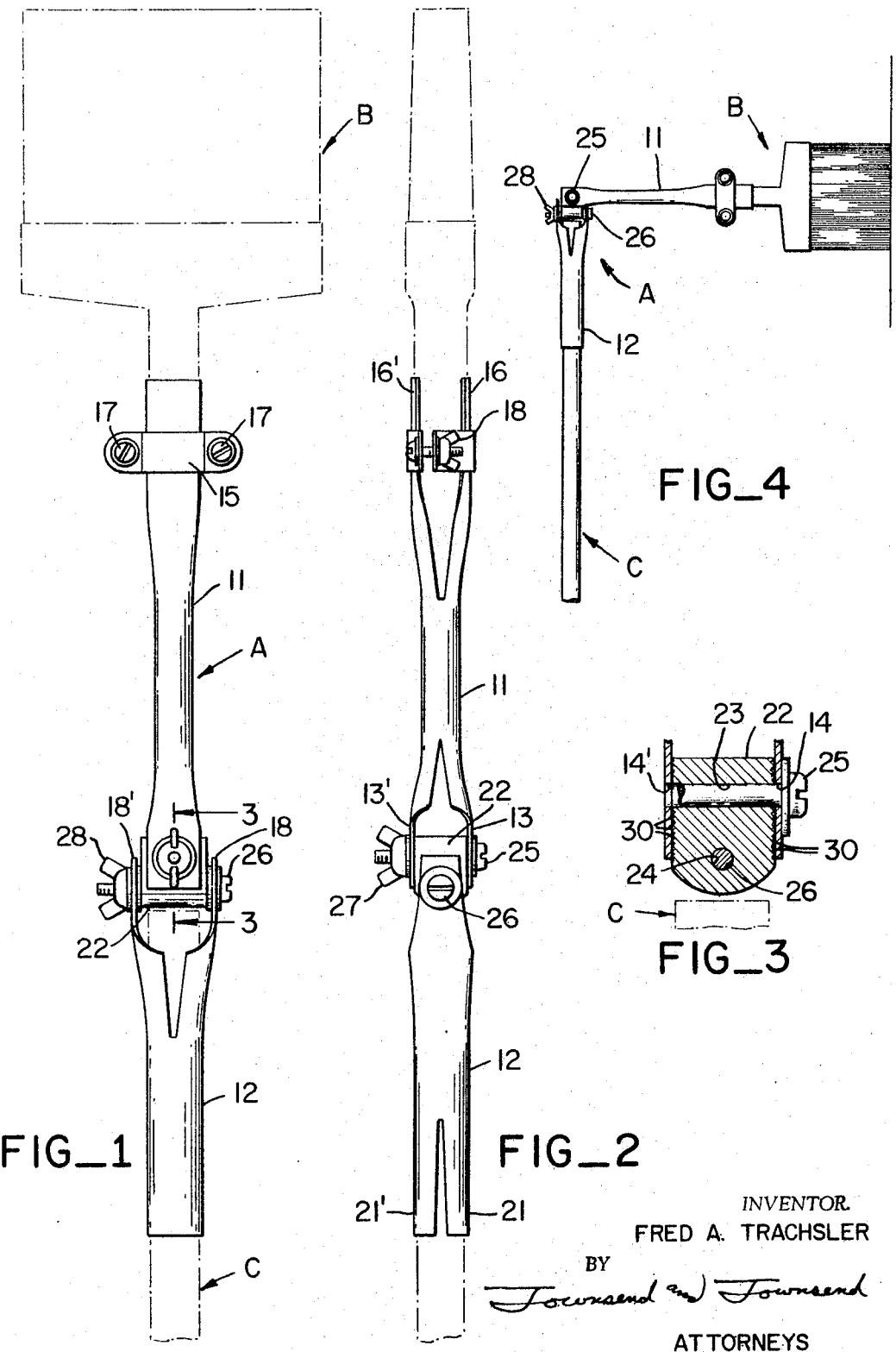

This invention relates to a holder for extending the range and conditions under which a conventional paintbrush can be employed.

Numerous devices have been suggested for increasing the range and adjustability of a paintbrush. For example, U.S. Patent No. 2,395,245, issued Feb. 19, 1946, discloses a paintbrush incorporating as an integral part of an extendable handle a universal joint in the form of a ball-and-socket. However, when employing such a universal joint, the brush is either held rigidly with respect to all directional movement or loosely held with respect to all directional movement. It is not possible to adjust such a universal joint so that the brush will be free for slight movement at the universal joint in a single plane as is often desired when painting, for example, high wall or ceiling surfaces.

It is a principal object of this invention to provide a paintbrush holder formed of a pair of tubular elongated members each bifurcated at both ends and pivotally mounted in end-to-end relationship through an interconnecting structure in such a manner that the two tubular elongated members can be positioned at substantially any angle in relation to each other. As a result of this unique arrangement, the position of a paintbrush inserted into the outer end of one of the elongated tubular members can be universally adjusted relative to a handle inserted into the outer end of the other tubular elongated member.

It is a feature and an advantage of this invention to provide a paintbrush holder in which the brush can be rigidly adjusted in any position with respect to the handle extension, yet be capable of a single planar movement when desired merely by slightly loosening one of the two rigid adjusting means.

It is a further feature and advantage of this invention to provide a paintbrush extension device which has the capacity for rigid retention of a great number of different sized conventional paintbrushes.

It is another feature and advantage of this invention to provide a paintbrush extension device to which can be attached an inexpensive handle of any desired length.

It is still another feature and advantage of this invention to provide serrations to prevent slippage at the surfaces of the universal joint and the bifurcated members.

These features and advantages will be better understood and other objects will become apparent from the following description of the invention especially when reference is made to the accompanying drawing, wherein:

FIG. 1 is a front elevational view of a specific embodiment of this invention;

FIG. 2 is a side elevational view of the embodiment illustrated in FIG. 1;

FIG. 3 is a cross-sectional view taken along lines 3—3 of FIG. 1; and

FIG. 4 is a schematic illustration of the employment of the embodiment of FIG. 1.

Referring now to the drawing in which similar characters of reference represent corresponding parts in each of the several views, there is shown a paintbrush holder A, paintbrush B and extension handle C.

Paintbrush holder A includes tubular elongated members 11 and 12 each bifurcated at both ends. Member 11 at a first end thereof contains spaced arms 13 and 13' having axially aligned openings 14 and 14' respectively therein, which are disposed normally to the axis of member 11. The second end of member 11 defines a paintbrush clamp 15 including spaced arms 16 and 16' each having aligned openings for receiving bolts 17. Clamp 15 is adapted to receive any conventional type of paintbrush and retain it in a rigid position with respect to member 11 by tightening wing nuts 18 onto bolts 17.

One bifurcated end of member 12 includes spaced arms 18 and 18' having axially aligned openings (not shown) which are disposed normally to the axis of members 12 and are similar to the openings in spaced arms 13 and 13' of member 11. The other bifurcated end of member 12 contains arms 21 and 21' for receiving extension handle C.

Interconnecting structure 22, formed of a suitable rigid material such as metal, contains spaced perpendicularly odiented holes 23 and 24 for receiving bolts 25 and 26 respectively. Member 11 is pivotally mounted through arms 13 and 13' on structure 22 by inserting bolt 25 through arms 13 and 13' and hole 23. Bolt 25 is thereby positioned so as to be substantially perpendicular to the axis of member 11. Wing nut 27 engages bolt 25 to allow for variations in the rigidity of the frictional engagement of arms 13 and 13' with structure 22.

In the same manner, member 12 is pivotally mounted through arms 18 and 18' on structure 22 by inserting bolt 26 through arms 18 and 18' and hole 24. Bolt 26 is thereby positioned so as to be substantially perpendicular to the axis of member 12. Wing nut 28 engages bolt 26 to allow for variations in the rigidity of the frictional engagement of arms 18 and 18' relative to structure 22.

Bolts 25 and 26, inserted in perpendicularly oriented holes 23 and 24, respectively, are therefore perpendicular to each other as most clearly illustrated by FIGS. 1 and 2. Through this unique arrangement of bolts 25 and 26 the axis of member 11 can be positioned to define any angle with respect to the axis of member 12 thereby enabling paintbrush A to be universally adjusted relative to the extension handle C.

Referring to FIG. 3 the surface of interconnecting structure 22 adjacent the end of handle C is depicted as being rounded. Thus handle C can be fully inserted between bifurcated arms 21 and 21' for a more secure fit, yet will not encumber the pivotal movement of structure 22 about bolt 26. This freedom of rotation is of utmost importance when it is desired to have single planar movement of brush B. For example, as most clearly illustrated by FIG. 4, when bolt 25 is tightened to wing nut 27 while bolt 26 is allowed to remain slightly loosened with respect to wing nut 28, structure 22 and member 11 rigidly held thereto, will be free to rotate about an axis normal to the axis of bolt 26, thereby producing "to and fro" movement of member 11 during paint application. This will allow the brush head to conform to the surface of the wall, irrespective of the angle formed between members 11 and 12. This flexibility between paintbrush B as held by member 11 and extension handle C as held by member 12 is similar to that which is obtained when the brush handle is actually being held in the hand of the person applying the paint.

In still another aspect of the invention, the abutting surfaces of structure 22 and the bifurcated arms 13, 13' and 18 and 18' of members 11 and 12, respectively, are fabricated with interlocking teeth or serrations 30. By aligning these serrations and tightening the respective wing nuts a significantly closer more secure fit can be obtained than when the serrations are not present.

While one embodiment of the invention has been shown and described, it will be apparent that other adaptations and modifications can be made without departing from the true spirit and scope of the invention.

What is claimed is:
1. A paintbrush holder, adapted for universal adjustment, comprising: first and second tubular elongated members, said members being bifurcated at each end to form respective pairs of spaced-apart oppositely-facing flanges; means mounted on a first end of said first member for fixably securing a paintbrush handle in co-axial alignment with said first member between the oppositely-facing flanges and for compressing said flanges against the handle; a first end of said second member having the oppositely-facing flanges adapted to receive a handle means therebetween in progressively tightly nested engagement as said handle means is inserted between said spaced-apart flanges; an interconnecting structure having a pair of spaced perpendicular oriented holes therethrough for pivotally mounting the second bifurcated ends of said first and second tubular members thereon in end-to-end relationship to each other, said structure having the sides adjacent each of said holes disposed normal to the axis of the respective hole; each of the second bifurcated ends of said members being provided with openings in said pairs of spaced-apart flanges aligned to correspond with one of said spaced holes; the flanges of said second bifurcated ends flanking said interconnecting structure; a first pivoting and locking means for releasably coupling said structure through the openings in the spaced-apart flanges in the second end of said first elongated member to one of said pair of perpendicular holes; and a second pivoting and locking means for releasably coupling said structure through the openings in the spaced-apart flanges in the second end of said second member to the other of said perpendicular holes, the bifurcations on the second ends of each of said members being of sufficient length to allow substantially complete pivotal movement of said members around said structure so that said first elongated member is permitted to independently pivot about a first axis through said first fastening device relative to the second elongated member and capable of being held in adjusted position, and said second elongated member is permitted to independently pivot relative to said first member about a second axis through said second fastening device perpendicular to said first axis and also capable of being held in adjusted position.

2. A paintbrush in accordance with claim 1 wherein the flanges of said second bifurcated ends and said structure have corresponding abutting serrated surfaces.

References Cited by the Examiner

UNITED STATES PATENTS

| | | | |
|---|---|---|---|
| 152,952 | 7/1874 | Mason | 306—17 |
| 612,685 | 10/1898 | Thorp et al. | 294—19 |
| 801,664 | 10/1905 | Holtmann | 287—14 |
| 809,432 | 1/1906 | Darrschmidt. | |
| 1,787,970 | 1/1931 | Bertola | 15—144.1 |
| 2,407,421 | 9/1946 | Herold | 306—11 |
| 2,469,050 | 5/1949 | Mygas | 15—146 X |
| 2,581,141 | 1/1952 | Raptis | 15—144.1 |
| 2,901,759 | 9/1959 | Smith et al. | 306—3 |
| 3,205,522 | 9/1965 | Then | 15—146 |

FOREIGN PATENTS 945,536   7/1956   Germany.

DANIEL BLUM, *Primary Examiner.*